Jan. 22, 1935.   L. NATHAN ET AL   1,988,954
PROCESS FOR THE ELIMINATION OF THE IMMATURE
ODORIFEROUS CONSTITUENTS IN BREWING
Filed Sept. 12, 1931
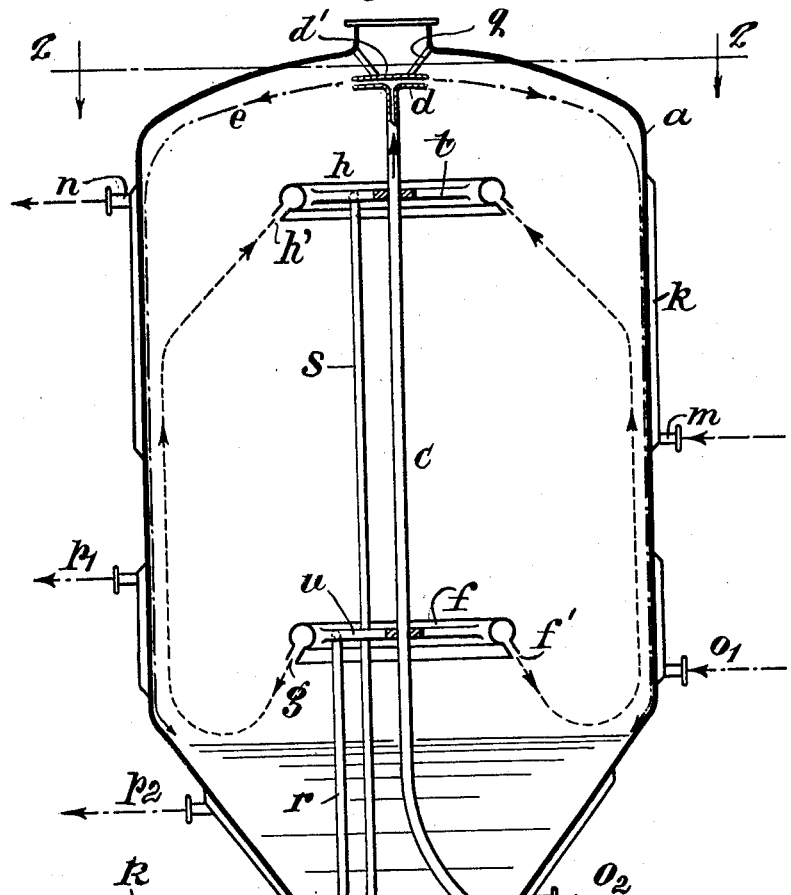
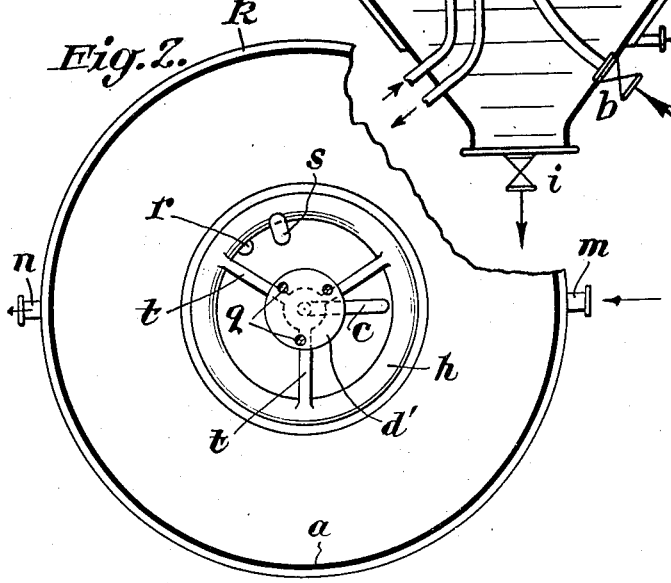
Inventors:
Leopold Nathan
and Géza Opekar
by
Lorrax Kehlenbeck
Attorneys Patented Jan. 22, 1935

1,988,954

UNITED STATES PATENT OFFICE 1,988,954

PROCESS FOR THE ELIMINATION OF THE IMMATURE ODORIFEROUS CONSTITUENTS IN BREWING

Leopold Nathan, Zurich, Switzerland, and Géra Opekar, Soerabaja, Java, assignors to Hansena A.-G., Glarus, Switzerland, a corporation Application September 12, 1931, Serial No. 562,452
In Germany December 2, 1930

2 Claims. (Cl. 195—2)

The term beer is used in the following specification to designate as well a beer of the legal percentage of alcohol as a beer of a higher percentage.

In the latter case reference is taken to the well known process of producing beer of higher percentage of alcohol as an intermediate product, which is afterwards brought down to the legal percentage by distilling off the surplus of alcohol.

In the known embodiments of the Nathan process (see for example, German Patent specification No. 217503), the elimination of the immature odoriferous constituents is effected by means of a current of carbonic acid gas, which is passed through the liquid in the fermentation vessel for a considerable time, thereby carrying away the said odoriferous constituents as soon as they are formed. This method has been found to possess the defect that, in certain circumstances, this long and energetic carbonic acid treatment may have an injurious effect on the yeast, so that, for example, too many dead cells result. The object of the present process is to remedy this defect, the process being carried out more simply and rapidly and resulting in a larger yield, by transferring the elimination of the immature odoriferous constituents to a later stage in the brewing process, whilst, at the same time, the fundamental idea of passing a current of carbonic acid gas through the beer is abandoned, the said odoriferous constituents being eliminated from beer which has just been made, that is, green beer, which has not been stored, by disposing the beer in a thin layer. A preliminary condition is that the beer should be saturated to a considerable extent with carbonic acid. It has now been discovered that, if the beer be allowed to flow, in a thin layer, through a suitable chamber, the carbonic acid gas will escape and carry away the immature odoriferous constituents in a very complete manner. Thus, the present invention relates to the elimination of the immature odoriferous constituents from green beer, by the application of a process, known in connection with other purposes, of spreading out a liquid (i. e. beer) in thin layers, thereby facilitating degasification processes. Storing removes the immature odoriferous constituents from green beer. Our process removes the immature odoriferous constituents without storing and thus eliminates the time factor. It operates on green beer which has just passed through the primary alcoholic fermentation but which has not stood long enough to cause any appreciable change in the beer. Green beer, of course, contains ethyl alcohol and other odoriferous substances more easily vaporized than ethyl alcohol, and our process removes the major portion of these other odoriferous substances without removing any appreciable amounts of ethyl alcohol.

In the adaptation of this process to brewing, and preferably the production of sterile beer, various points have to be considered.

In the first place it is important that, in disposing the beer in thin layers, the escape of the immature odoriferous constituents shall not be accompanied by the penetration of air into the beer. This object can be achieved, even when the elimination takes place in a chamber filled with air, by arranging that the carbonic acid gas does not escape completely from the beer, but that sufficient is left therein to prevent the penetration of air into, and its solution in, the beer. Even in these circumstances, the immature odoriferous constituents can be eliminated almost completely.

The second important point is that of foaming, which previously has been regarded as being very abundant from a thin layer. It has been found, however, that foaming does not occur to the extent anticipated, the reason being that only very minute bubbles of carbonic acid gas are formed in the thin layers, and the more tenuous the layer, the smaller the amount of foam. It has been proved, moreover, that the foam can be destroyed easily by cooling, especially by chilling suddenly. The elimination of the immature odoriferous constituents can also be facilitated by warming and by a reduction of pressure. It is known also that the friction between a liquid containing carbonic acid gas and a solid substratum favours the escape of the carbonic acid gas. It is self-evident that the carbonic acid gas escaping from the beer in this manner can be replaced by a special saturation process. A certain importance also attaches to the removal of the immature odoriferous constituents (for which purposes special arrangements generally have to be made), in that the amount of the escaping carbonic acid gas is mostly inadequate to carry the aforesaid odoriferous constituents out of the separation chamber at a sufficiently rapid rate. Hence, in general, it is necessary to set up an artificial flow of gas in the said chamber, for which purpose sterile air and carbon dioxide are employed. The use of the latter has the advantage that it prevents, from the outset, any penetration of air into the beer. On the other hand, however, a simple evacuation of the gaseous mixture may be considered. It has been established that in the process described, carbonic acid gas and the immature odoriferous constituents, with traces only of alcohol, escape from the liquid, for alcohol evaporates at temperatures higher than those at which carbonic acid gas and the immature odoriferous substances volatilize, which temperatures are employed in the process. This is the case particularly when the process is carried out at temperatures which do not exceed about 16° C., but, of course, it depends also on the conditions of pressure.

In cases in which a beer is to be produced, free from alcohol or having a low alcohol content, the entire process must be followed by one of the known de-alcoholization processes.

Various methods of producing thin layers of liquid are known in different industries. The one which suggests itself first to the brewer, is that employing the ordinary refrigerator, but it will be evident that other methods, such as the baffle plate apparatus for fractional distillation or other apparatus, for rectification purposes, are also applicable. Thin flowing layers can be produced also in apparatus in which the liquid is sprayed on to the walls of vessel, down which it will flow in a tenuous layer. It is also possible to produce thin layers without any solid support by forming a thin, free-flowing curtain or rain of liquid.

Apart from the foregoing considerations, it must be borne in mind, in selecting the apparatus, that it is highly desirable to be able to carry out cleaning operations with facility, to ensure that the apparatus can be sterilized and, of course, to ensure that the foaming cannot give rise to difficulties, such as might occur readily in very narrow spaces.

The following procedure may be adopted when, for example, a refrigerator is used:

The beer is made to run, in the usual manner, over the refrigerator, in a thin stream, the apparatus being located in a room fitted with means for carrying away the gases which are formed. In contrast, however, to the usual method of using the refrigerator, the upper portion, at least, should be traversed by a heating liquid, in order to facilitate the separation of the gases by heat. As the beer must be recooled, whether it is to be put through a final fermentation process or passed to a storage vessel, such cooling may be incorporated in one operation with the warming. In employing an ordinary refrigerator, it has been found that, by utilizing about the upper two-thirds thereof for warming the beer, the lower portion can be employed for cooling it by means of a flow of a cooling liquid. This has the additional advantage of reducing considerably the foaming, in that all the foam produced flows down to the bottom of the refrigerator, being deposited in the cold lower portion, where it is innocuous as regards the upper portion of the apparatus. In some cases the formation of this deposit of foam can be facilitated by exposing the lower portion of the apparatus to the action of a current of cold gas, blown into the foam from the outside, the foam being thus destroyed and the removal of the resulting gases effected. Experiments have shown that, in this manner, 100 hectolitres (2200 gallons) of beer can be freed from the immature odoriferous constituents in two hours, the average thickness of the layer of beer being about from 1 to 2 millimeters.

Experiments have also shown that it is advisable to expel 90% of the carbonic acid gas in the beer, leaving about 10% only of the gas produced in fermentation.

A suitable method of carrying out the process, in which the fermentation vessel already in use in the Nathan process can be employed is as follows:—

Two plates, separated at their periphery by a distance corresponding with the thickness of the layer to be formed, are superimposed in the upper portion of such a vessel. The beer laden with immature odoriferous constituents, is introduced, from the centre of the plates, into the intermediate space and then issues, in the form of a bell, from the gap between them. This bell-shaped stream impinges against the sides of, and runs down to collect in the bottom cone of, the vessel, at which point cold carbonic acid gas is blown thereinto thus destroying the foam.

The usual accessories of the fermentation vessel, such as the jacket space and the various pipes, enable the temperatures and pressure conditions to be controlled without further trouble.

A suitable apparatus for carrying out the process is shown in the drawing, in which:

Fig. 1 is a diagrammatic vertical section of an arrangement for carrying out the invention, and Fig. 2 is a diagrammatic horizontal section on the line 2—2 of Fig. 1.

The beer enters the pipe $c$ by way of the valve $b$ and, at the top of said pipe, is distributed, in the form of a bell $e$, by the two plates $d$ $d'$, towards the wall of the vessel $a$, down the sides of which it flows and collects in the conical bottom of the vessel, where it is able to run off through the valve $i$. The plate $d'$ is held in place by any suitable means such as by the brackets $q$ depending from the top of the vessel $a$.

Carbonic acid gas, preferably cold, is supplied by means of a pipe $r$ to an annular tube $f$, the discharge slot $f'$ of which is directed obliquely and downwardly, and the issuing gas is also directed, as a thin film or bell-shaped annular current $g$, towards the wall of the vessel $a$, flowing down over the surface of the body of beer collected at the bottom of the vessel, and then upwardly along the downwardly flowing film of beer, from which it swerves upwardly and inwardly to be drawn off through a corresponding annular tube $h$, with an intake slot $h'$. It then flows from the vessel through an outlet pipe $s$. The tubes $h$ and $f$ are held in place by any suitable means such as by spiders $t$ and $u$ respectively, which are mounted on the pipe $c$. At its upwardly flowing portion, the current or stream of gas forms a tubular film located within, and closely adjacent to, the downwardly flowing tubular current or film of liquid.

The upper part of the vessel $a$ is provided with a jacket $k$, into which a current of warm water is admitted, entering through the pipe $m$, and leaving through the pipe $n$. A stream of cold water also traverses the pipes $o'$ $p'$ and $o^2$ $p^2$.

As has been indicated in the introductory part of this specification, the liquid treated according to our invention is beer, under which term we desire to have included a fermented liquid which has not yet reached the final stage. In other words, the present invention relates to a brewing process. Accordingly, the term "beer" as used in the appended claims is to be interpreted as meaning beer at any stage of the brewing process.

What we claim is:

1. A process of treating a green beer containing ethyl alcohol and other odoriferous substances more easily vaporized than ethyl alcohol, so as to make ripe beer therefrom, which consists in removing the major portion of said other odoriferous substances from said beer without removing any appreciable amount of ethyl alcohol, by forming said green beer into a descending film, directing a stream of gas against said current of green beer at one end of the path of said current, causing said stream then to flow lengthwise of said current in a surface contact therewith to take up the said odoriferous substances therefrom, removing the gas stream with such odoriferous substances at the other end of the path of said current of green beer, and maintaining the temperature during the process below 16° C.

2. A method of artificially aging green beer containing ethyl alcohol and other odoriferous substances more easily vaporized than ethyl alcohol, by removing therefrom after the primary alcoholic fermentation and before any appreciable change in the beer takes place, the said other odoriferous substances without removing any appreciable amount of ethyl alcohol, which consists in forming said green beer into a descending film, directing a stream of gas against said current of green beer at one end of the path of said current, causing said stream then to flow lengthwise of said current in a surface contact therewith to take up the said odoriferous substances therefrom, removing the gas stream with such odoriferous substances at the other end of the path of said current of green beer, and maintaining the temperature during the process below 16° C.

LEOPOLD NATHAN.
GÉRA OPEKAR.

CERTIFICATE OF CORRECTION.

Patent No. 1,988,954.                                                                 January 22, 1935.

LEOPOLD NATHAN, ET AL.

It is hereby certified that error appears in the above numbered patent requiring correction as follows: In the grant, heading to the printed specification, and signature, the name of the second named patentee was erroneously written and printed as "Géra Opekar" whereas said name should have been written and printed as Géza Opekar, as shown by the record of the case in this office; and that the said Letters Patent should be read with this correction therein that the same may conform to the record of the case in the Patent Office.

Signed and sealed this 5th day of March, A. D. 1935.

Leslie Frazer
Acting Commissioner of Patents.

(Seal)